(No Model.)
H. MITTENDORF.
RIDING ATTACHMENT FOR PLOWS.
No. 584,643.  Patented June 15, 1897.
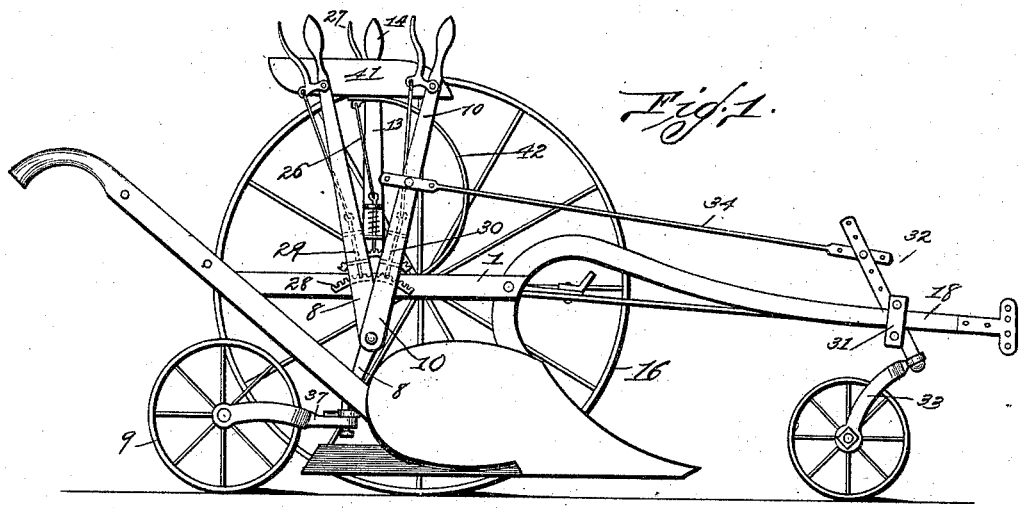
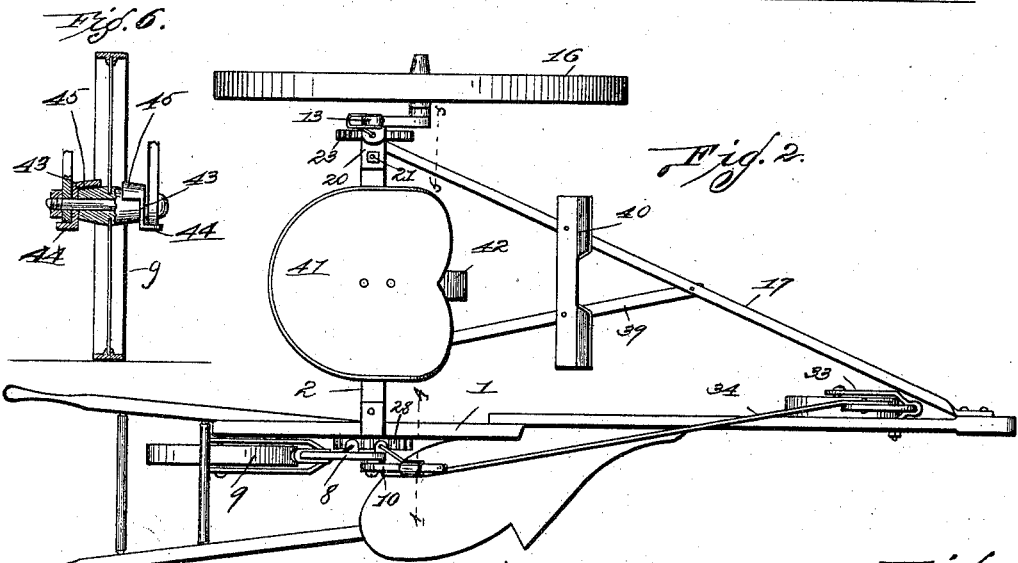
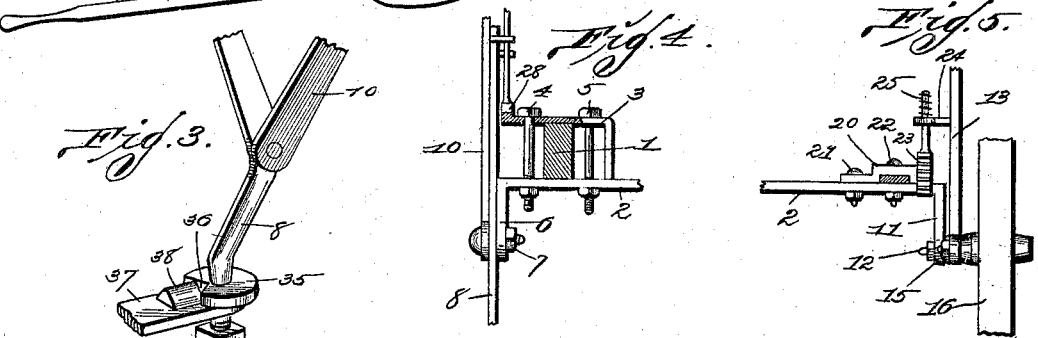
Attest:
W. F. Smith
S. G. Wells
Inventor:—
Henry Mittendorf
By Higdon & Higdon & Longan
Att'ys

UNITED STATES PATENT OFFICE.

HENRY MITTENDORF, OF DRAKE, MISSOURI.

RIDING ATTACHMENT FOR PLOWS.

SPECIFICATION forming part of Letters Patent No. 584,643, dated June 15, 1897.

Application filed May 18, 1896. Serial No. 591,936. (No model.)

*To all whom it may concern:*

Be it known that I, HENRY MITTENDORF, of the city of Drake, Gasconade county, State of Missouri, have invented certain new and useful Improvements in Riding Attachments for Plows, of which the following is a full, clear, and exact description, reference being had to the accompanying drawings, forming a part hereof.

My invention relates to a riding attachment for plows; and it consists in the novel construction, combination, and arrangement of parts hereinafter described and claimed.

In the drawings, Figure 1 is a side elevation showing my invention in practical use in connection with the ordinary iron or wood beam walking-plow. Fig. 2 is a top plan view of the parts shown in Fig. 1. Fig. 3 is an enlarged detail view of the swiveled joint of the rear caster. Fig. 4 is a vertical sectional view on the line 4 4 of Fig. 2. Fig. 5 is a vertical sectional view on the line 5 5 of Fig. 2. Fig. 6 is a sectional view of a wheel.

In the construction of my improved riding attachment for walking-plows I substitute a strong wooden or iron bar 1 to connect the plow-handles with the plow-beam in place of the usual light iron strap. A bar 2 is attached at one end to the center of the said bar 1 and extends at right angles thereto toward the land. The connection between the bars 1 and 2 is shown in Fig. 4. The bar 2 passes under the wooden bar 1 and an iron clamp 3 is placed upon top of said bar 1 and bolts 4 and 5 pass down upon either side of the bar 1 through the bar 2 and clamp 3 and are held firmly in position by the usual nuts.

The bar 2 has the downwardly-turned end 6, through which passes a bolt 7, and a lever 8 is fulcrumed upon said bolt, the handle of said lever projecting upwardly, and to the lower end of said lever is attached an ordinary caster 9. A second lever 10 is also pivoted upon said bolt 7 at its lower end.

At the land end of the bar 2 is the downwardly-turned portion 11, through which passes a bolt 12, and a bell-crank lever 13 is pivoted upon said bolt 12. Upon the upper end of said bell-crank lever 13 is a handle 14, and through the lower end of said lever passes a bolt 15, which forms the spindle upon which the wheel 16 turns.

A bar 17 is attached to the front end of the plow-beam 18 and extends diagonally backward to the land end of the bar 2. A block 20, of irregular shape, is placed upon top of the rear end of said bar 17 and bolts 21 and 22 secure said block to the bar 2, and the bolt 22 also passes through the bar 17, as shown in Fig. 5. Upon the outer end of the block 20 is a segment of teeth or holes 23. A perforated ear 24 extends inwardly from the lever 13 and a spring-catch 25 operates in the perforation in said ear and engages the teeth or holes of the segment 23. The spring-catch 25 is operated from the upper end of the handle 13 in the ordinary way by a rod 26, hooked into an eye in the upper end of said spring-catch, and said rod is attached to the lever 27, which lever is in turn pivotally attached to the upper end of the lever 14. The handles 8, 10, and 14 are constructed in two pieces, which are bolted together, as shown in Fig. 1.

Upon the inner end of the clamp 3 is a segmental toothed rack 28, and spring-catches 29 and 30, similar to the one already described, are attached, respectively, to the handles 8 and 10 and are operated to engage the teeth or holes of said rack 28.

A clamp 31 is attached to the plow-beam 18 near its front end and a bar 32 is pivotally attached to said clamp and an ordinary swiveled caster 33 operates upon the lower end of said bar 32. A rod 34 connects the upper end of said bar 32 with the handle 10.

The frame of the caster 33 is so constructed that when it is desired to plow turf and sod the wheel may be removed and an ordinary rolling colter substituted.

Upon the lower end of the lever 8 is horizontally positioned a disk 35, having the notch 36 in its rear edge, and the upper end of the frame 37 of the caster 9 has a lug 38 positioned to normally operate in said notch 36 and so constructed that when the plow is turning a corner the disk 35 will raise up and slide over said lug 38 and this operation will raise the rear or lower the point of the plow.

A brace-bar 39 extends from about the center of the bar 17 to about the center of the bar 2, and a foot-rest 40 is attached to said bars 17 and 39, as shown in Fig. 2. The seat 41 having the spring 42 is attached to about the center of the bar 2.

The wheel 16 is adjustable by means of the lever 13, carrying the spring-catch 25 and operating in the teeth or holes 23. The caster 33 is adjustable by means of the lever 10 and the bar 34, connecting said lever 10 with the bar 32 of said caster. The caster 9 is adjustable by means of the lever 8.

In Fig. 6 I show a shield for the hubs of the wheels which is designed to keep the sand and dirt out of the axles. The sheet-metal body 43 has a central aperture designed to fit upon the axle at the end of the hub of the wheel. The lower end 44 of said body is bent outwardly to engage the frame and the upper end 45 of said body is bent inwardly and curved to cover the upper part of the end of the hub. There is one of the shields on each end of the hub and each of the wheels of the attachment is supplied with the shields.

A plow-holder or riding attachment of my improved construction may be readily attached to any ordinary walking-plow and when so attached converts said plow into a sulky, and it possesses many advantages over the devices heretofore in use for holding walking-plows.

I claim—

1. In a device for holding an iron-beam walking-plow, a horizontally-positioned bar connecting the handles of the plow with the plow-beam, a second bar having one of its ends attached to the center of the first-mentioned bar and extending in a horizontal plane toward the land side and having its land end turned downwardly, a bolt passing horizontally through said land end and projecting outwardly, a bell-crank lever pivotally mounted upon said bolt, the handle of said lever projecting upwardly and the lower end of said lever projecting forwardly, a bolt positioned horizontally through said forwardly-projecting end of said bell-crank lever, a wheel mounted upon said bolt, a catch upon said handle, and a rack mounted in position to be engaged by said catch for controlling and operating the position of said second bar relative to said wheel, substantially as specified.

2. In a device of the class described, a longitudinally-extending horizontally-positioned bar connecting the plow-handles with the plow-beam, a transversely-extending bar horizontally positioned under the center of said longitudinally-extending bar, a clamp passing above said longitudinally-extending bar and securely bolted to said transversely-extending bar and holding said bars securely in position relative to each other, the land end of said transversely-extending bar being turned downwardly, a bolt horizontally positioned in said land end and projecting outwardly, a bell-crank lever mounted upon said bolt with one end projecting upwardly and the other end projecting forwardly, a handle upon said upper end, a bolt positioned in said forward end, a wheel mounted upon said bolt, a catch upon said upper end, and a rack in position to be engaged by said catch, substantially as specified.

3. In a device of the class described, a longitudinally-extending horizontally-positioned bar connecting the plow-handles with the plow-beam, a transversely-extending bar horizontally positioned under the center of said longitudinally-extending bar, a clamp passing above said longitudinally-extending bar and securely bolted to said transversely-extending bar and holding said bars securely in position relative to each other, the fallow end of said transversely-extending bar being turned downwardly, a bolt passing through said downwardly-turned end, a lever pivotally mounted upon said bolt and having a handle at its upper end, a catch upon said lever, a rack attached to said longitudinally-extending bar and in position to be engaged by said catch and a caster attached to the lower end of said lever, substantially as specified.

4. In a device of the class described, a longitudinally-extending horizontally-positioned bar connecting the plow-handles with the plow-beam, a transversely-extending bar horizontally positioned under the center of said longitudinally-extending bar, a clamp passing above said longitudinally-extending bar and securely bolted to said transversely-extending bar and holding said bars securely in position relative to each other, the land end of said transversely-extending bar being turned downwardly, a bolt horizontally positioned in said land end and projecting outwardly, a bell-crank lever mounted upon said bolt with one end projecting upwardly and the other end projecting forwardly, a handle upon said upper end, a bolt positioned in said forward end, a wheel mounted upon said bolt, a catch upon said upper end, a rack in position to be engaged by said catch, the fallow end of said transversely-extending bar being turned downwardly, a bolt passing through said downwardly-turned end, a lever pivotally mounted upon said bolt and having a handle at its upper end, a catch upon said lever, a rack attached to said longitudinally-extending bar and in position to be engaged by said catch and a caster attached to the lower end of said lever, substantially as specified.

5. In a device of the class described, the lever 8 pivotally connected to the plow, the horizontally-positioned disk 35, having the notch 36 in its rear edge, attached to the lower end of said lever 8, the frame 37 of the caster pivotally attached to the lower end of said lever 8 and below said disk 35, and the lug 38 attached to the upper side of the upper end of the frame 37 and in position to normally operate in said notch 36, substantially as specified.

6. In a device of the class described, a shield, consisting of the metal body 43 having a central aperture designed to fit upon the axle of the wheel and having the lower end 44 bent outwardly to engage the frame of the caster and having the upper end 45 bent inwardly and curved to cover the upper part of the end of the hub of the wheel, substantially as specified.

In testimony whereof I affix my signature in presence of two witnesses.

HENRY MITTENDORF.

Witnesses:
    CHAS. TOEDTMANN,
    SAMUEL LUTTER.